(12) United States Patent
Fu et al.

(10) Patent No.: US 11,796,031 B2
(45) Date of Patent: Oct. 24, 2023

(54) AXIAL DISPLACEMENT AMPLIFIED EDDY CURRENT DAMPER

(71) Applicant: DALIAN UNIVERSITY OF TECHNOLOGY, Liaoning (CN)

(72) Inventors: Xing Fu, Liaoning (CN); Hongnan Li, Liaoning (CN); Wenlong Du, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 611 days.

(21) Appl. No.: 17/047,592

(22) PCT Filed: Mar. 4, 2019

(86) PCT No.: PCT/CN2019/076811
§ 371 (c)(1),
(2) Date: Oct. 14, 2020

(87) PCT Pub. No.: WO2020/177045
PCT Pub. Date: Sep. 10, 2020

(65) Prior Publication Data
US 2021/0115999 A1    Apr. 22, 2021

(51) Int. Cl.
*F16F 15/03* (2006.01)
*H02K 49/04* (2006.01)
(Continued)

(52) U.S. Cl.
CPC ......... *F16F 15/035* (2013.01); *H02K 49/046* (2013.01); *E04B 1/98* (2013.01);
(Continued)

(58) Field of Classification Search
CPC ...... F16F 15/035; F16F 15/03; F16F 2222/06; F16F 2230/0005; F16F 2230/0052;
(Continued)

(56) References Cited

U.S. PATENT DOCUMENTS

| 3,488,535 A | * | 1/1970 | Baermann | H02K 49/00 310/105 |
| 2013/0189098 A1 | | 7/2013 | Covington | |

(Continued)

FOREIGN PATENT DOCUMENTS

| CN | 102797786 A | 11/2012 |
| CN | 107339001 A | 11/2017 |

(Continued)

*Primary Examiner* — Michael Andrews
(74) *Attorney, Agent, or Firm* — MUNCY, GEISSLER, OLDS & LOWE, P.C.

(57) ABSTRACT

An axial displacement amplified eddy current damper is disclosed. The axial movement of a slide bar is converted into the rotation of copper sheets and generates eddy current for energy consumption. The copper sheets are rotated and amplified by adjusting the sizes of gears. The short displacement of the slide bar can cause a large angle rotation of the copper sheets, so that energy consumption efficiency is high. The damping parameter can be adjusted by adjusting the magnetic field strength of permanent magnets, the thickness of the copper sheets and the distance from the copper sheets to the permanent magnets. The permanent magnets are adopted to provide continuous magnetic field sources, without external energy, thereby generating long-term and stable vibration reduction effect.

5 Claims, 2 Drawing Sheets

(51) Int. Cl.
*E04B 1/98* (2006.01)
*F16H 1/22* (2006.01)

(52) U.S. Cl.
CPC ... *F16F 2222/06* (2013.01); *F16F 2230/0005* (2013.01); *F16F 2230/0052* (2013.01); *F16F 2230/10* (2013.01); *F16F 2232/00* (2013.01); *F16H 1/22* (2013.01)

(58) Field of Classification Search
CPC .......... F16F 2230/10; F16F 2232/08; H02K 49/046; H02K 49/04; H02K 7/104; F16H 1/22; E04B 1/98
USPC .......................................... 310/105, 92, 103
See application file for complete search history.

(56) References Cited

U.S. PATENT DOCUMENTS

| | | | |
|---|---|---|---|
| 2020/0263759 A1* | 8/2020 | Imanishi | F16F 6/005 |
| 2021/0148114 A1* | 5/2021 | Fu | F16F 7/10 |
| 2021/0148434 A1* | 5/2021 | Fu | F16F 15/035 |

FOREIGN PATENT DOCUMENTS

| | | | |
|---|---|---|---|
| CN | 109138207 A | | 1/2019 |
| CN | 109751352 A | | 5/2019 |
| JP | 2008185184 A | | 8/2008 |

* cited by examiner

AXIAL DISPLACEMENT AMPLIFIED EDDY CURRENT DAMPER

TECHNICAL FIELD

The present invention belongs to the technical field of structural vibration control, and particularly relates to an axial displacement amplified eddy current damper.

BACKGROUND

An axial displacement damper is a device that absorbs seismic vibration energy, wind vibration energy, mechanical vibration energy and other forms of vibration energy to reduce the damage to buildings, and is widely used in buildings such as civil buildings, industrial buildings and bridges. When the building is suddenly impacted by external vibration, the axial displacement damper consumes the impact energy of an external force on the building, so as to reduce the vibration amplitude of the building and greatly reduce the impact and damage of the external vibration to the building. However, the existing axial displacement dampers still have many defects, such as low energy dissipation efficiency at small amplitude, and poor capability of consuming vibration and shock energy. These defects greatly affect the safety of the buildings, lives and property of people. With respect to the defects in the existing product, the present invention proposes an axial displacement amplified eddy current damper through the combination of the axial displacement damper and an eddy current damper.

SUMMARY

The purpose of the present invention is to design a damper with reasonable structure and obvious vibration reduction effect.

The technical solution of the present invention is as follows:

An axial displacement amplified eddy current damper is mainly composed of an elliptical hollow body 1, a cover plate 2, a bolt 3, a slide bar 4, a gear a5, a gear b6, a gear c7, copper sheets 8, permanent magnets 9, a ball a10, a ball b11, balls c12, division plates 13, a hinge 14 and a U-shaped bar 15.

The elliptical hollow body 1 and the cover plate 2 are connected through the bolt 3, and form a shell of the entire damper.

The slide bar 4 is of a hollow bar structure, which penetrates through the shell and conducts axial slide through the ball a10; the inner surface of the slide bar 4 is divided into an upper inner surface and a lower inner surface; the upper inner surface is processed into teeth engaged with the gear a5; the lower inner surface is processed into a local protrusion; the ball b11 is located in the local protrusion; and the ball b11 is located near the gear a5.

The gear a5 has teeth on both sides and no tooth in the middle; the teeth on both sides are engaged with the teeth on the slide bar 4; and the toothless part in the middle is closely fitted with the ball b11.

The gear b6 and the gear a5 are combined and rotated simultaneously, and rotation axes of the gears penetrate through the division plates 13.

The gear c7 and the gear b6 are engaged, and rotated through the balls c12 on the division plates 13; and the gear c7 has teeth between two division plates 13 and the remaining part is a toothless smooth cylinder.

The copper sheets 8 are fixed on the end part of the gear c7, and rotate along with the rotation of the gear c7.

The permanent magnets 9 are located on both sides of the copper sheets 8.

The hinge 14 is located on the end part of the entire device, and can freely rotate.

The radius of the gear b6 is larger than the radius of the gear c7.

The entire device is made of magnetic material, and the ball a10, the ball b11 and the balls c12 are spherical steel balls.

The stroke of the slide bar is controlled by the U-shaped bar and the shell of the device.

The present invention has the working principle that:

When vibration occurs, the building is deformed to elongate or shorten the damper. At this moment, the slide of the slide bar causes the rotation of the gear, thereby causing the copper sheets to rotate between the permanent magnets. According to the Lenz's law, the copper sheets are subjected to a force that inhibits the motion thereof. This is because the relative motion of the copper sheets and the magnetic field causes a motional electromotive force in the copper sheets, and the electric charge moves to form eddy currents. These eddy currents are subjected to a lorentz force under the action of the magnetic field, and the direction is always opposite to the direction of motion of the copper sheets, thereby forming resistance, that is, eddy current damping force. At the same time, due to the thermal effect of the current, a part of the vibration energy may be converted into thermal energy, thereby reducing the vibration. Especially, if the sliding distance of the slide bar is d, the radius of the gear a is Ra, the radius of the gear b is Rb, the radius of the gear c is Rc, and Rb>Rc, then the rotation angle of the copper sheets can be amplified; the rotation angle is (d/Ra)×(Rb/Rc); and the amplification is Rb/Rc, that is, the larger the radius ratio of the gear b to the gear c is, the higher the energy consumption efficiency is.

The present invention has the following beneficial effects:

(1) In the axial displacement amplified eddy current damper in the present invention, the axial motion of the slide bar is converted into the rotation of the copper sheets and generates eddy current for energy consumption. The copper sheets rotation are amplified by adjusting the sizes of the gears. A short displacement of the slide bar can cause a large angle rotation of the copper sheets, which greatly increases energy consumption efficiency.

(2) In the axial displacement amplified eddy current damper in the present invention, the damping parameter can be adjusted by adjusting the magnetic field strength of the permanent magnets, the thickness of the copper sheets and the distance from the copper sheets to the permanent magnets.

(3) In the axial displacement amplified eddy current damper in the present invention, the permanent magnets are adopted for providing continuous magnetic field sources, and a long-term stable vibration reduction effect can be generated without outside energy.

(4) The axial displacement amplified eddy current damper in the present invention is made of the magnetic material, which can effectively avoid magnetic leakage in magnetic circuits, so that the efficiency of eddy current damping is increased, and the influence on various components and parts around is avoided.

(5) The axial displacement amplified eddy current damper in the present invention has reasonable design, simple structure and convenient installation.

In the figures: 1 elliptical hollow body; 2 cover plate; 3 bolt; 4 slide bar; 5 gear a; 6 gear b; 7 gear c; 8 copper sheet; 9 permanent magnet; 10 ball a; 11 ball b; 12 ball c; 13 division plate; 14 hinge; 15 U-shaped bar.

DETAILED DESCRIPTION

To make the purpose, features and advantages of the present invention more clear and legible, the technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
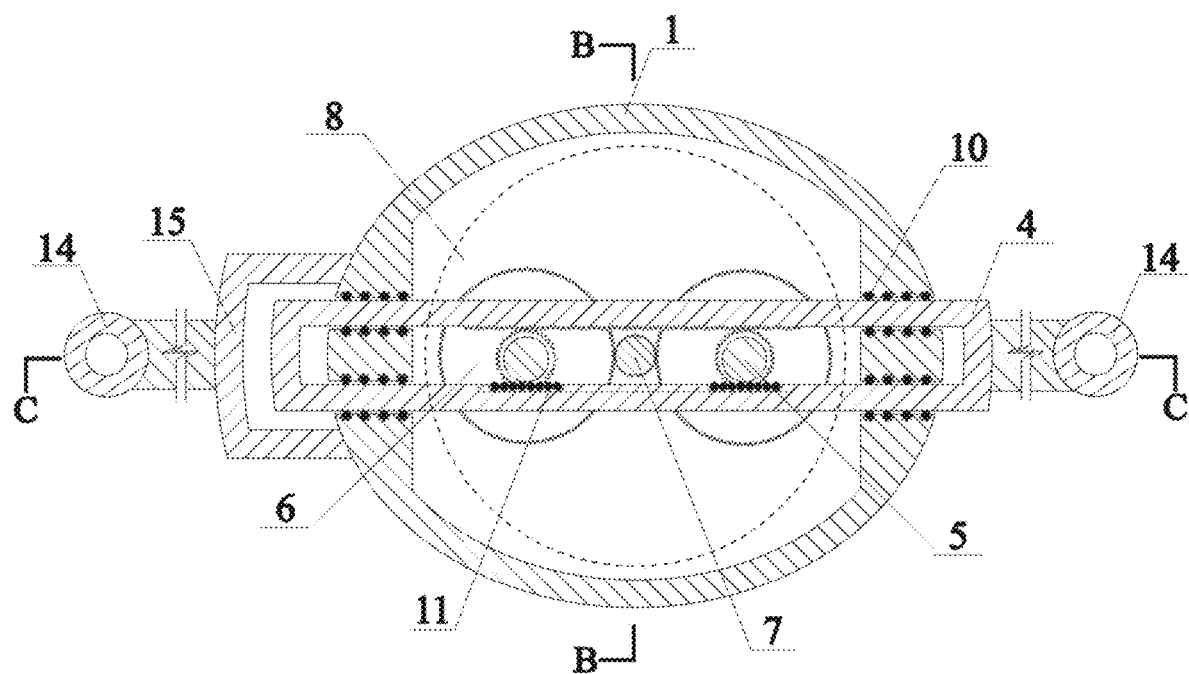
FIG. 1 is an A-A sectional view of an axial displacement amplified eddy current damper provided in embodiments of the present invention.
Figure 2:
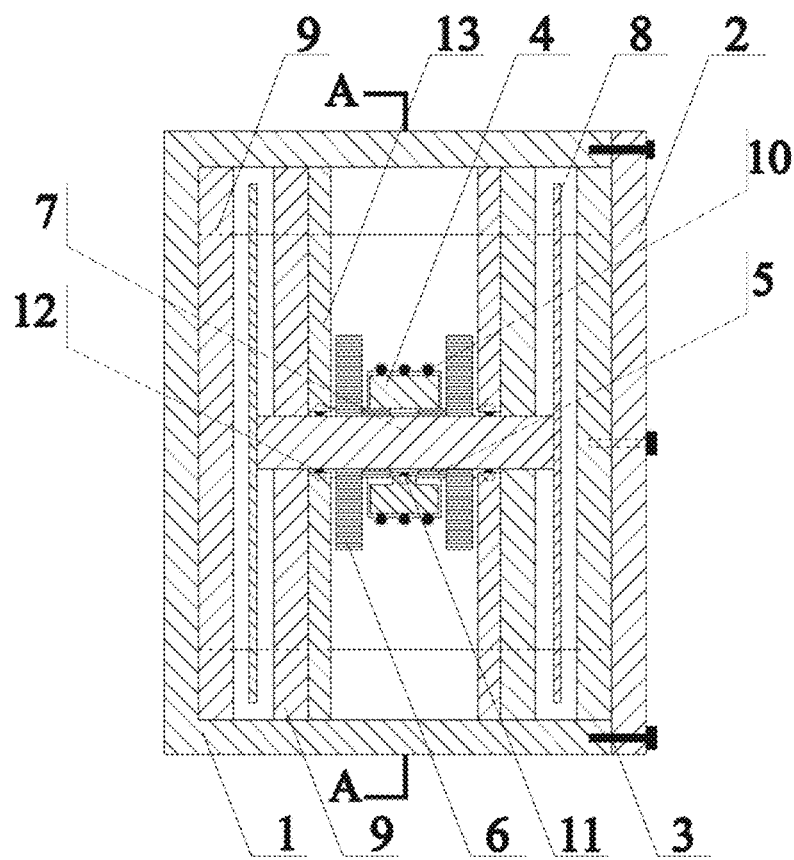
FIG. 2 is a B-B sectional view of an axial displacement amplified eddy current damper provided in embodiments of the present invention.
Figure 3:
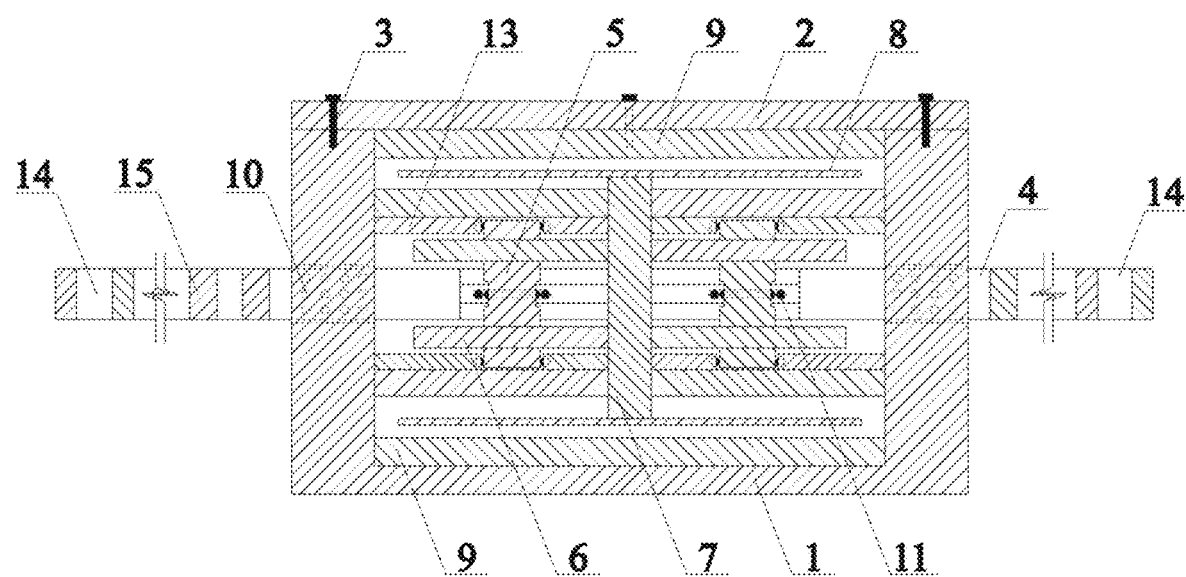
FIG. 3 is a C-C sectional view of an axial displacement amplified eddy current damper provided in embodiments of the present invention.

With reference to FIG. 1 to FIG. 2, an embodiment of an axial displacement amplified eddy current damper provided by embodiments of the present invention is composed of an elliptical hollow body 1, a cover plate 2, a bolt 3, a slide bar 4, a gear a5, a gear b6, a gear c7, copper sheets 8, permanent magnets 9, a ball a10, a ball b11, balls c12, division plates 13, a hinge 14 and a U-shaped bar 15.

In the present embodiment, the elliptical hollow body 1 and the cover plate 2 are connected through the bolt 3, and form a shell of the entire damper.

When vibration occurs, the slide bar 4 axially slides through the ball a10 on the shell. The slide of the slide bar 4 drives the rotation of the gear a5. At the inner side of the slide bar 4, the upper part is processed into teeth, and the lower part is provided with the ball b11 near the gear a5. The slide bar 4 around the ball b11 is processed into a local protrusion. The ball b11 is installed on the local protrusion of slide bar 4. The gear a5 is processed into a shape having teeth on both sides and no tooth in the middle; the teeth on both sides are engaged with the teeth on the slide bar 4; and the toothless part in the middle is closely fitted with the ball b11. The upper and lower sides of the gear a5 are stressed, which can prevent the unilateral stressed gear from disengaging and increase the transmission efficiency.

The gear b6 and the gear a5 are combined and rotated simultaneously, and rotation axes of the gears penetrate through the division plates 13.

The gear c7 and the gear b6 are engaged. The gear c7 has teeth between two division plates 13, and the remaining part is a toothless smooth cylinder. The entire gear c7 penetrating through the division plates 13, is connected with the copper sheets 8 and rotates simultaneously. The balls c12 on the division plates 13 have the effect of reducing the rotational friction of the gear c7. The permanent magnets 9 are located on both sides of the copper sheets 8.

The hinge 14 is located at the end part of the entire device, can rotate freely, and has the effect of connecting a structure and the damper during use.

In the present invention, the axial movement of the slide bar 4 is converted into the rotation of the copper sheets 8 and generates eddy current for energy consumption. The copper sheets 8 are rotated and amplified by adjusting the sizes of the gears. The short displacement of the slide bar 4 can cause a large angle rotation of the copper sheets 8, which greatly increases energy consumption efficiency. The damping parameter can be adjusted by adjusting the magnetic field strength of the permanent magnets 9, the thickness of the copper sheets 8 and the distance from the copper sheets 8 to the permanent magnets 9. The permanent magnets 9 are adopted to provide continuous magnetic field sources, without external energy, thereby generating long-term and stable vibration reduction effect. The use of the magnetic material can effectively avoid magnetic flux leakage of a magnetic circuit, which not only increases the damping efficiency of the eddy current, but also avoids the influence on various surrounding components. The present invention has reasonable design, simple structure, convenient installation and good application prospect.

Attention shall be paid during the design of the present invention: firstly, the radius of the gear b6 is larger than the radius of the gear c7. Secondly, the entire device is made of the magnetic material; the balls are spherical steel balls; and all the balls are coated with lubricating oil to reduce friction. Thirdly, the middle of the slide bar 4 is processed into a "convex" shape. The gear a5 has teeth on both sides and no tooth in the middle; and the upper and lower sides come into contact with the slide bar 4, which can prevent the unilateral stressed gear from disengaging and increase the transmission efficiency. Fourthly, the stroke of the slide bar 4 is controlled by the U-shaped bar 15 and the shell of the device.

The above embodiments of the present invention are not intended to limit the protection scope of the present invention, and the embodiments of the present invention are not limited thereto. According to the above content of the present invention and in accordance with ordinary technical knowledge and frequently-used means in the art, other various modifications, replacements or alterations made to the above structure of the present invention without departing from the basic technical idea of the present invention shall fall within the protection scope of the present invention.

The invention claimed is:

1. An axial displacement amplified eddy current damper, which is mainly composed of an elliptical hollow body, a cover plate, a bolt, a slide bar, a first gear, a second gear, a third gear, copper sheets, permanent magnets, a first ball bearing, a second ball bearing, a third ball bearings, division plates, a hinge and a U-shaped bar, wherein the elliptical hollow body and the cover plate are connected through the bolt, and form a shell of the entire damper;

the slide bar is of a hollow bar structure, which penetrates through the shell and conducts axial slide through the first ball bearing inside the shell; the inner surface of the slide bar is divided into an upper inner surface and a lower inner surface; the upper inner surface is processed into teeth engaged with the first gear; the lower inner surface is processed into a local protrusion; the second ball bearing is located in the local protrusion; the second ball bearing is located near the first gear;

the first gear has teeth on both axial ends but no tooth in an axial middle portion; the teeth on both axial ends are engaged with the teeth on the slide bar; the toothless part in the axial middle portion is closely fitted with the second ball bearing;

the second gear and the first gear are meshed and rotated simultaneously, and rotation axes of the second gear and the first gear penetrate through the division plates;

the third gear and the second gear are engaged, and rotated through the third ball bearings on the division plates; the third gear has teeth between two division plates and the remaining part is a toothless smooth cylinder;

the copper sheets are fixed on the end part of the third gear, and rotate along with the rotation of the third gear;

the permanent magnets are located on both sides of the copper sheets;

the hinge is located on the end part of the entire device, and can freely rotate.

2. The axial displacement amplified eddy current damper according to claim 1, wherein the radius of the second gear is larger than the radius of the third gear.

3. The axial displacement amplified eddy current damper according to claim 1, wherein the entire device is made of magnetic material, and the first ball bearing, the second ball bearing and the third ball bearings are spherical steel balls.

4. The axial displacement amplified eddy current damper according to claim 3, wherein the stroke of the slide bar is controlled by the U-shaped bar and the shell of the device.

5. The axial displacement amplified eddy current damper according to claim 1, wherein the stroke of the slide bar is controlled by the U-shaped bar and the shell of the device.

* * * * *